Jan. 23, 1962    R. S. WEBB    3,018,411
PER PULSE CUT-OFF CIRCUIT
Filed May 3, 1960    3 Sheets-Sheet 3
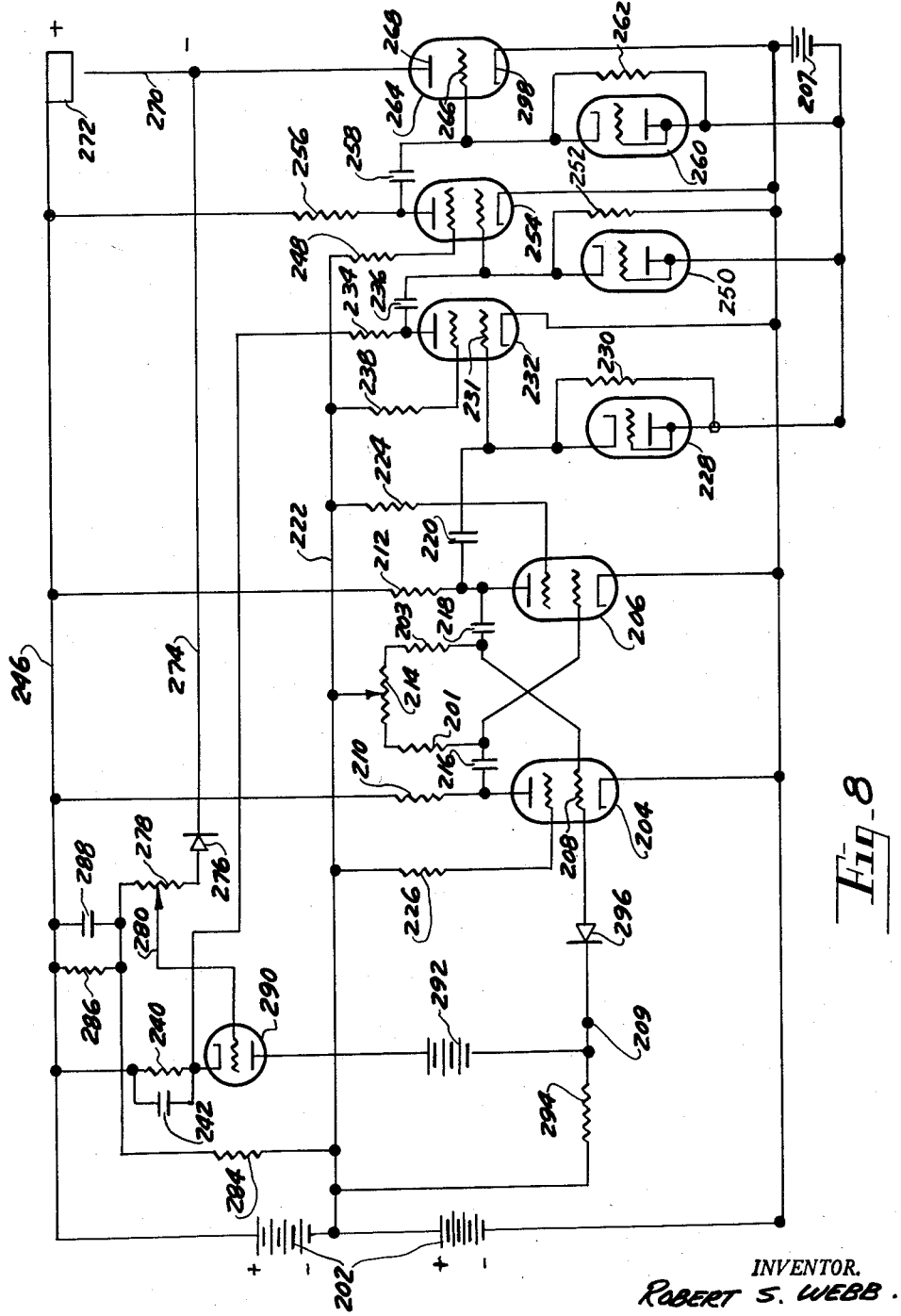
Fig_8
INVENTOR.
ROBERT S. WEBB.
BY
M. K. Murphy
ATTORNEY

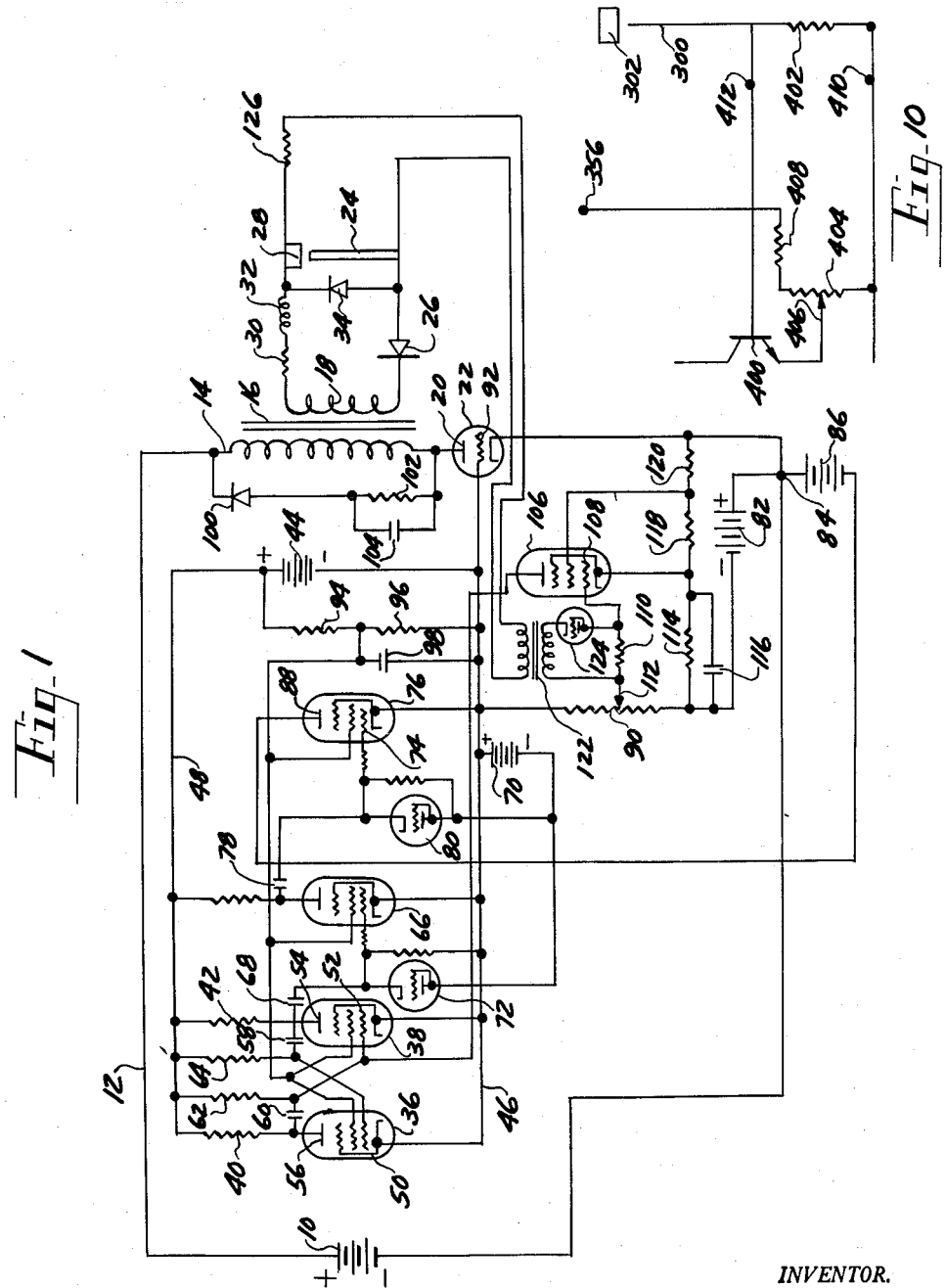

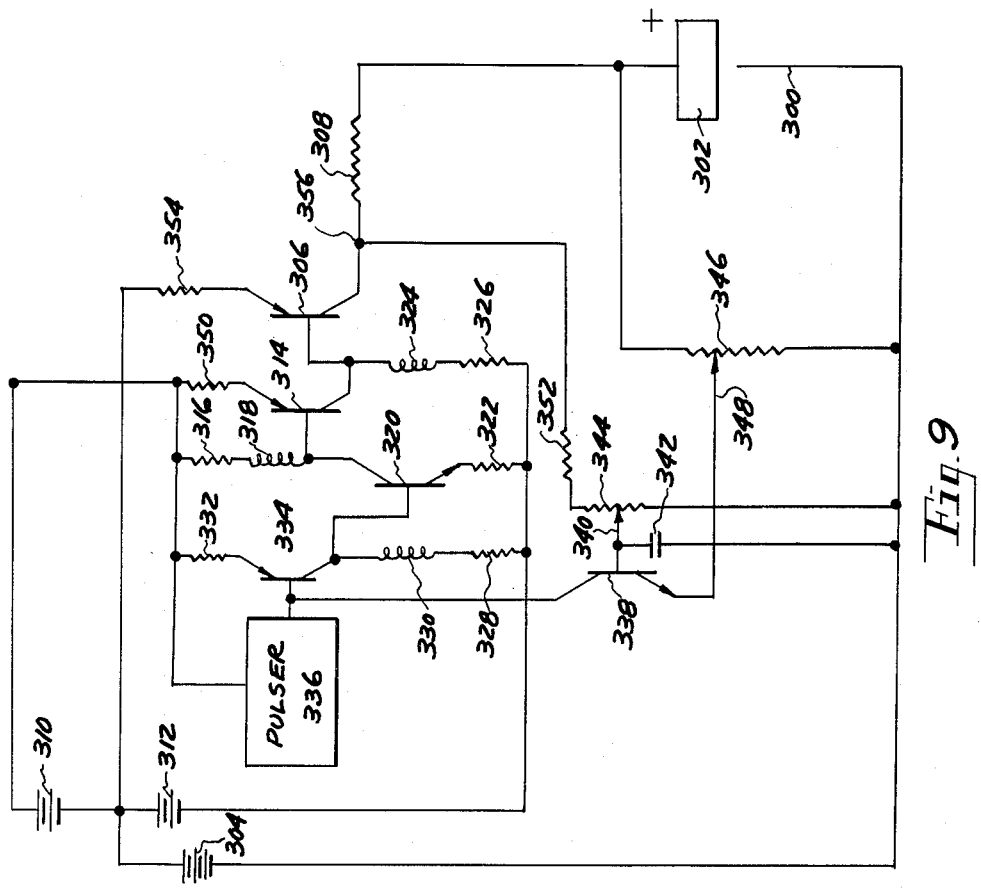

United States Patent Office 3,018,411
Patented Jan. 23, 1962

3,018,411
PER PULSE CUT-OFF CIRCUIT
Robert S. Webb, Bloomfield Hills, Mich.
Filed May 3, 1960, Ser. No. 26,526
18 Claims. (Cl. 315—163)

This invention relates to improvements in methods and apparatus for electrical-discharge-machining, sometimes referred to as "E.D.M.," "arc-machining," or "spark-machining," and this application is a continuation-in-part of my copending application Serial No. 747,078, filed July 7, 1958.

During recent years, the electrical-discharge-machining process has been used increasingly in the forming of cavities in very hard materials such as tool steels, cemented carbides, and the like. Improvements have been made in rate of machining, accuracy and finish, and in practically all of the modern E.D.M. apparatus now in use, electron tubes are utilized to obtain the rapid interruption of the power circuit that is required for rapid stock removal with good surface finish.

Electron tubes commercially obtainable are severely limited in their power carrying capacity. These devices are high-voltage, low-current devices. The machining gap in E.D.M. apparatus, on the other hand, has a voltage drop of only about 15 volts. The present method of achieving high machining rate is to pass as high as possible current through the gap which necessitates paralleling tubes in banks, sometimes hundreds in number.

For example, in one E.D.M. machine currently in use, a bank of 150 type 6AS7 vacuum tubes connected in parallel comprise the power supply to the machining gap. A 115 volt input supply is connected to the machine and the circuit interruption characteristic is such that power pulses are delivered to the gap approximately one-third of the time. The peak current is about 150 amperes and the average current about 50 amperes, the voltage drop through the power circuit being about 100 volts. It is known, however, that 6AS7 tubes and some other types are capable of interrupting circuits with voltages much higher than 115 volts.

In my copending application above referred to, of which this application is a continuation-in-part, I have disclosed and claimed E.D.M. power supply circuits for delivering to the machining gap much higher currents with the same number of electron tubes. When using such machining circuits, it is extremely important that accidental short-circuits between the electrode and workpiece be prevented. In fact, any abnormally low voltage condition across the gap must not be permitted to continue for any appreciable time because the high current available from the power supply will cause damage not only to the workpiece, but to the power supply as well.

Accordingly, it is the principal object of my invention to provide a "per pulse cut-off circuit," in which each individual machining pulse is electronically inspected and either permitted to pass or interrupted instantaneously. Thus each pulse is unaffected by the characteristics of previous pulses and only faulty pulses are cut off.

A still further object is to provide a machining circuit utilizing transistors instead of electron tubes which incorporates the above advantages.

Other objects and advantages will become apparent from the following specification which, taken in conjunction with the accompanying drawings, discloses preferred forms of my device.

In the drawings:

FIG. 1 is a schematic wiring diagram of a typical E.D.M. power supply constructed in accordance with my invention;

FIG. 2 is a graphical representation of the grid drive voltage of the power tube bank in the above power supply;

FIG. 3 is a similar representation of the voltage in the primary of the power transformer;

FIG. 4 represents the voltage in the secondary of the power transformer;

FIGS. 5, 6 and 7 are similar representations of a similar set of conditions, but showing a longer "on time" pulse;

FIG. 8 shows a modification of the power supply circuit wherein the machining gap is connected directly in an electron tube circuit;

FIG. 9 is an example of a transistorized circuit incorporating my improvement; and FIG. 10 is a modification of the FIG. 9 circuit which incorporates a current sensitive cut-off device.

Referring to FIG. 1, it will be seen that I have shown at 10 the main power supply for the apparatus, which comprises a 300 volt, D.C. supply, this voltage being about maximum for the plate supply of the 6AS7 power tubes. A lead 12 from the positive side of the power supply connects to one side of primary 14 of the power transformer 16. The latter has a secondary 18 and is of the iron-core type, although an air-core transformer may be used for more delicate machining, particularly finishing operations.

The other side of primary 14 is connected to the anode 20 of a power tube 22. It will be understood that the tube 22 represents a bank of tubes (in this instance 6AS7's) connected in parallel. Almost any number of such tubes may be so connected to provide the required power flow through the gap.

The secondary 18 of the power transformer 16 is connected at one side to the electrode 24 through a blocking diode 26, and at the other side to a workpiece 28. The elements 30 and 32 represent respectively the lumped resistance and lumped inductance of the leads from the secondary 18 to the gap between the electrode and workpiece. The gap is shunted by a second blocking diode 34 as will be explained below.

The power tube bank 22 is controlled by a multivibrator network which comprises tubes 36 and 38. These tubes are preferably pentodes, type 6DQ5. The plates or anodes of these tubes are connected through load resistors 40, 42, and lead 48 to the positive terminal of a suitable power supply 44, the negative terminal of which is connected with the cathodes of the tubes by lead 46. The power supply 44 may be separate or it may be derived from the main supply 10 as desired.

The control grids 50, 52, of the tubes 36, 38, are cross-connected to the anodes 54, 56, respectively through coupling condensers 58, 60, and are connected to the positive side of the multivibrator power supply through the grid resistors 62, 64.

The output signal from multi-vibrator tubes 36, 38, is fed into an amplifier, which may comprise one or more pentode tubes 66, through condenser 68 and clamped to negative bias voltage 70 through diode 72. The amplified and resquared signal from tube 66 is fed to the grid 74 of pentode 76 (which may be one of a bank) where it is again amplified before being fed to the power tube bank 22. The coupling to the "driver" tube 76 is through a coupling condenser 78 and a clamping diode 80 is provided to insure positive cut-off characteristic. Suitable isolation and signal resistors are also provided as shown to control the operating characteristics of diodes 72 and 80.

The power required to drive the main power tube bank 22 is in the order of several hundred watts, and to obtain increased efficiency, the amplifier 76 is floated in the grid circuit of the bank 22 rather than connected to the negative terminal of bias supply 82 as would be expected. Since the control signal appears between the cathode of driver 76 and point 84 of the circuit which is grounded, the network just described, which comprises a multivibrator and two stages of amplification, may be thought of as a floating signal source.

The output signal from this network is of rectangular wave form and is of substantially greater magnitude than that obtained from the conventional square wave generator. Normally these signal generators have an output of approximately ten watts. In the E.D.M. circuit of FIG. 1, the power required to drive the grids of the tube bank 22 is in the order of two hundred watts and more. A booster power supply 86 is preferably provided in series with the bias supply 82 to provide adequate voltage for the plate 88 of driver 76.

The output signal from driver tube 76 is developed from the voltage drop across variable resistor 90, which signal pulse with the added voltage of power source 82 constitutes the drive to the grids 92 of the bank 22. Proper adjustment of the circuit parameters will provide a signal at grids 92 having a selected on-time characteristic such as indicated in FIGS. 2 and 5, which illustrate graphically two somewhat extreme conditions.

As stated above, the signal generator power supply is the source 44. Resistors 94 and 96, the latter being shunted by a condenser 98, are provided as shown.

The primary 14 of transformer 16 has a damping network consisting of diode 100, resistor 102 and shunt capacitance 104 connected in shunt therewith.

The transformer 16 must be a stepdown transformer capable of handling relatively high currents at relatively high frequencies. The development of extremely thin iron lamination stock and specialized design now makes possible the design of transformers having the characteristics required for the circuit of FIG. 1. The transformer selected should have a maximum voltage swing on the primary equal to the peak voltage rating of the power tube selected and a turns ratio which will match the gap voltage required in E.D.M.

The aforementioned damping network limits the induced voltage or negative fly-back in the primary 14, which occurs between power pulses, to the voltage rating of the tubes 22 and this prolongs the lives of these tubes.

As so far described, it will be seen that the tube bank 22 normally is biased to non-conducting condition by voltage source 82. An amplified signal from the multivibrator will be impressed on the grids 92 of the power bank 22 and will overcome the normal grid bias and render the tube bank conductive. In accordance with the preselected adjustment of the circuit parameters, a voltage will occur across the primary 14 as graphically represented (for example) by FIG. 3, which will induce a voltage in the secondary like that represented in FIG. 4. This secondary voltage is instantly effective across the gap between electrode 24 and workpiece 28, and a power pulse will be delivered across the gap eroding the workpiece. This sequence is repeated at high frequency until the machining operation is completed or the operation interrupted by the machine's power feed, as is known in the art.

The gap between electrode 24 and workpiece 28 is flooded with dielectric fluid during machining as is common in EDM.

The circuit of FIG. 1 includes a "watch-dog," which functions automatically to cut-off the power to the gap in event of a short circuit condition, which might damage the workpiece, or in event of malfunction of the apparatus, which might cause damage to the workpiece or to the components of the apparatus.

This "per pulse cut-off" comprises a pentode 106, the control grid 108 of which is connected through a resistor 110 to tap 112, which latter taps the keying resistor 90 at an intermediate point. The grid 108 normally is biased non-conducting by the shunt resistor and condenser network 114, 116, which is connected across the voltage source 82 through the screen voltage resistor 118 and the voltage reducing resistor 120. The voltage across resistor 90 plus that of the source 82 is, of course, the voltage which drives the grids 92 of the power tube bank 22. A selected portion of this voltage is thus effective on the grid 108 of cut-off tube 106 and tends to render tube 106 conductive whenever bank 22 is rendered conductive. The plate of tube 106 is connected to the grid circuit of multivibrator tube 38 by line 107 and conduction through tube 106 will instantaneously cut-off operation of the multivibrator.

However, the secondary of a transformer 122 (called for convenience the "cut-off transformer") is connected across the resistor 110 through a blocking diode 124. The primary of the transformer 122 is connected across the gap between electrode 24 and workpiece 28 through a limiting resistor 126.

If the apparatus is functioning normally, a drive signal on grids 92 of the bank 22 will result in a striking voltage appearing across secondary 18 of power transformer 16 and the gap will fire. This voltage would have to be only about 20 if there were no losses in the firing circuit. However, normal circuit losses require a voltage magnitude of 60 volts or more, and should a short circuit occur across the gap, the short circuit current would be almost 150% of normal. With narrow pulse operation, as graphically illustrated in FIG. 4, the peak current selected is usually the peak pulse rating of the individual tubes of the power tube bank, and a 150% overload of this pulse current would strip the tube cathodes with comparatively few pulses. Thus ordinary short circuit cut-off devices, such as thermally responsive devices, operate too slowly to provide protection.

My per-pulse cut-off device permits the power circuit to be operated with maximum efficiency because it renders it unnecessary to limit the power input to the gap to less than maximum desired on account of possibility of short circuits. The cut-off device operates to cut off the power input instantaneously, that is to say, in about 5% of the period of a power pulse, and thus provides complete safety to the apparatus. This cut-off device is extremely important in the operation of the machine especially when precision machining of expensive workpieces is being performed, where heat checking of the hole being cut might require scrapping of the piece. The readiness of the device to function instantly is constantly maintained by the precise balancing of the circuit parameters. The connection of grid 108 to the keying resistor 90 tends to render tube 106 conductive each time the multivibrator pulses, but the dominating negative bias of the network 114—116 inhibits conduction of tube 106 in the absence of any keying signal. During normal operation, the keying pulse voltage developed across resistor 90 is exactly neutralized in the grid circuit of tube 106 by the action of circuit 122, 124, 110. However, appearance of a voltage across primary of transformer 122 (gap voltage) lower than a preset minimum will upset this voltage balance and instantaneously cause tube 106 to conduct and cut off the multivibrator through line 107. It is, of course, clear that the "leading edge" of the power pulse just initiated will cross the gap, but the cut-off is so fast that the power pulse will be literally squelched after initiation and no appreciable power will be delivered to the gap.

Interruption of operation of the multivibrator will, of course, cut off tube bank 22 as well as tube 106. After the normal pulse repetition delay time, the multivibrator will resume pulsing, and if the trouble in the gap which caused the abnormal low voltage has cleared, such as by back-up of the power feed, clearing of sludge, or the like, normal machine operation will be restored automatically.

It will be understood that the cut-off circuit shown is not limited to use with the particular power delivering circuit shown. It would be equally useful with other gap power circuits whether of the impedance matching type or not.

Reference is now made to FIGS. 2, 3 and 4, which show graphically voltage conditions in certain portions of the FIG. 1 circuit under one selected set of conditions. FIG. 2 shows the grid drive voltage on the grids of power tubes 22 when a signal of relatively short "on time" per cycle is received from the multivibrator. The point A of FIG. 2 represents the negative grid bias normally impressed on the grids 92. This negative voltage is effective on the grids for portions of the cycle represented by the lines AB and EF. The curve BCDE shows that the grid voltage is rendered positive by at least a sufficient amount to render the tube bank conductive for a period CD, the grids being made negative again, as indicated by DEFG for the remainder of the cycle. FIG. 3 shows that in response to the short pulse received from the power tube bank, a voltage AB is impressed on the primary of transformer 16 for a time BC. FIG. 4 shows the voltage pulse ABCD delivered to the gap between electrode 24 and workpiece 28, the negative flyback of the secondary winding DEFG being blocked from the gap by rectifier 26. Shunt rectifier 34 compensates for any leakage through rectifier 26 which might occur at the high frequencies used. There cannot be, therefore, any reverse polarity pulse across the gap.

FIGS. 5, 6 and 7 show a set of conditions similar, respectively, to FIGS. 2, 3 and 4, except that the primary voltage pulse triggered by the multivibrator is of relatively long duration.

In any event, for successful normal operation, the secondary voltage of correct polarity to fire the gap must be of sufficient magnitude to deliver on open circuit enough power to achieve a striking voltage at the gap of at least thirty volts and a sustained voltage in the order of twenty volts, taking into consideration the resistance and inductance of the secondary circuit as indicated in lumped form at 30 and 32.

For a more detailed consideration of the power pulse delivered by the secondary 18, reference is again made to FIG. 3. It is assumed that the transformer 16 has a 5 to 1 ratio, approximately 300 volts being impressed on the primary from the tube bank 22 and 60 volts being available across the secondary 18. The current amplified pulse is indicated by the rectangular wave curve ABCD, which pulse is of correct polarity and power phasing to deliver power to the gap. Flyback voltage DEFG is effectively blocked by rectifier 26 to prevent gap discharge of opposite polarity.

Reference is made now to FIG. 8 which shows schematically, a direct connected electron tube circuit in which a bank of tubes represented by triode 264 is connected directly to the electrode 270. The workpiece 272 is, in this instance, connected to the positive terminal of the machine power supply 202.

Tube bank 264 has its cathode 298 connected to the negative terminal of voltage 202, thus completing the series EDM power circuit which provides erosive pulses across the machining gap controlled by excitation of the grids 266 of the bank 264.

In precise machining by EDM, it is imperative that the power tube bank be pulsed on and off at precise, sharply defined intervals. That is to say, the voltage wave form between grid 266 and cathode 298 must be rectangular in form or as nearly so as can be achieved, such that bank 264 is turned on and off sharply to provide optimum gap discharge. This rectangular drive pulse to grid 266 is generated by multi-vibrator tubes 204 and 206 operating according to well known principles of vacuum tube multivibrator design. It will be seen by further analysis that in this particular circuit the arc is On or power is supplied to the machining gap when multivibrator tube 204 is On and power bank 264 is Off when multivibrator tube 204 is Off. The rectangular pulsating output of multivibrator tube 206 is connected through coupling condenser 220 to the control grid of the buffer tube 232. The pulsating signal is clamped to bias 207 through diode 228 and drive or turn On signal for tube 232 is developed across resistor 230. The rectangular voltage drive tends to be in excess of bias 207 and the excess portion is clipped by grid 231 of pentode 232 in a manner well known in the electronics industry as "re-squaring of the pulse" such that the output of tube 232 has an even sharper rise and fall voltage drive than the output of the multivibrator. In a similar manner, a tube bank represented by pentode 254 amplifies the output from pentode 232 and signal is again re-squared at the grid of this tube as well as the power tube bank itself at grid 266. The output tube bank 264 consists of many vacuum tubes, perhaps hundreds or thousands and in turn requires several banks of the order of 5 to 50 tubes in order to furnish drive power of sufficient amplitude. The grid circuit of tube bank 264 is therefore supplied with rectangular pulsating power in the order of 50 to 5000 watts or higher, depending on the size of tube bank 264. Rectangular pulsating power even sufficient to drive grid 266 of power bank 264 is presently not commercially available in the electronics industry.

A novel design feature of this particular circuit is in the multivibrator grid return and potentiometer 214. The special characteristic of this particular circuit is that by adjusting potentiometer 214, an increase in resistance in one grid circuit automatically decreases resistance in the other circuit, and an analysis of the respective On and Off time of each of the multivibrator tubes and the formulas for determining this, shows how to achieve a fixed output frequency. In other words, for a particular combination of condensers 216 and 218, the time duration of one complete cycle of operation may be represented by $K[(C216+C218)\ (R201+R214+R203)]$. This is novel and particularly important in an EDM circuit, since a constant frequency of operation may be maintained and the arc On time may be varied directly with the On time of multivibrator tube 204 as determined by condenser 216, resistor 201 and the portion of the potentiometer 214 included in the grid return circuit of multivibrator tube 206. Thus turning the potentiometer to the right, and increasing the resistance in the grid circuit of tube 206 will cause an increase in the On time of tube 204 and therefore the arc. Since output tube 264 during On time may be represented by a resistor, the quantity of machining current permitted in the gap may be controlled by the respective On time of multivibrator tube 204 and therefore tube bank 264, thus giving precise control of the machining current supplied to the gap and permitting infinitesimal adjustments of that machining current while maintaining a fixed machining frequency.

The screen grid of pentode 204 is connected through limiting resistor 226 to screen voltage tap 222. Similarly, the screen grid of pentode 206 is connected through resistor 224, the screen grid of pentode 232 is connected through resistor 238 and the screen grid of pentode 254, through resistor 248 each to screen voltage tap 222.

Consider next the particular operation of the per-pulse cut-off tube and its associated circuitry. The operation of this circuitry as power tube bank 264 is pulsed On, is such that it is capable of supplying power to the machining gap. Prior to the machining pulse, multivibrator 204, buffer tube 232 and power tube bank 264 are all cut-off or non-conducting. Per-pulse cut-off tube 290 is rendered non-conductive by the D.C. bias stored across condenser 288 developed by voltage dividing resistors 284 and 286. With cut-off tube 290 non-conductive, operation of the multivibrator is unimpaired and as multivibrator tube 204 turns On, correspondingly buffer tube 232 is rendered conductive. Included in the plate circuit of tube 232 is limiting resistor 234 and keying resistor 240 connected in the cathode circuit of cut-off tube 290. Delay condenser 242 is shunted across resistor 240 such that the signal from buffer tube 232 is delayed briefly from arriving in the cathode circuit of tube 290. The time constant of this delay is very brief and generally in the order of a few microseconds or less and is intended to permit passage of drive signal to the output tube bank 264. Assuming a condition of open circuit, the full open circuit voltage is generated across the working gap and is detected by sensing lead 274 and presented to reference potentiometer 278 through diode 276. The portion of this signal determined by the setting of potentiometer arm 280 is presented to the grid of cut-off tube 290. This signal corresponding exactly to arc voltage renders the grid of 290 more negative. After the delay interval achieved though use of condenser 242, signal is developed across resistor 240 in the cathode lead of cut-off tube 290. This signal is of such a polarity tending to render tube 290 conductive; however, the presence of a portion of the arc voltage at terminal 280 cancels this keying signal and thus the cut-off tube remains non-conductive and operation of the circuit is unimpaired and proceeds in accordance with the normal functions of multivibrator tubes 204 and 206.

If the working gap is shorted or is a low enough voltage such that the signal developed at potentiometer arm 280 is insufficient to overcome the keying signal developed across 240, cut-off tube 290 becomes instantaneously conductive. Conduction of the cut-off tube causes electron flow from the negative terminal of floating D.C. supply voltage 292 through resistor 294 to screen voltage tap 222 of the main D.C. power supply. The voltage generated across resistor 294 is substantially in excess of that of screen voltage tap 222 thus causing terminal 209 to become negative with respect to cathode 204. Terminal 209 is rendered sufficiently negative to interrupt conduction of multivibrator tube 204 and trigger the Off portion of the cycle. During the period of conduction, tube 204 was On and in-phase with power tube bank 264. Thus, as cut-off tube 290 renders tube 204 non-conductive, the amplifier instantaneously renders power tube bank 264 non-conductive interrupting the condition of short circuit or low voltage conduction. This interruption lasts for the normal duration of Off time or dwell between pulses as determined by multivibrator grid circuit 218, 203, 214 of tube 204. In this manner, the flaw or short circuit in the working gap instantaneously interrupts the particular machining cycle in a manner exactly similar to that of the circuitry of FIGURE 1. During normal operation of this circuit, grid 208 of multivibrator tube 204 is isolated from the cut-off circuitry by diode 296, said diode becoming conductive only during periods of operation of cut-off tube 290, at which time terminal 209 is more negative than either cathode 204 or grid 208 and the function or end result of operation of this cut-off circuit is identical to that of FIGURE 1, although no decoupling is employed in the circuitry of FIGURE 1 other than the plate of cut-off tube 106 in FIGURE 1.

Consider next the operation of transistorized EDM circuitry as shown, for example, in FIGURE 9. This is but one of many circuits embodying transistors for the control of the pulsating arc power as well as in the pre-amplifier. It is essential to realize that in this instance, rectangular pulses are also generated in a manner very similar to the circuitry of FIGURE 8. In the transistor circuitry of FIGURE 9, the working gap consisting of electrode 300 and workpiece 302 is connected through dropping resistor 308, to the collector of transistor 306. The emitter of transistor 306 is connected to the positive terminal of the EDM D.C. power supply 304. The negative terminal of this power supply is connected to the electrode. Thus in a manner very similar to the circuitry of FIGURE 8, a transistor in this instance, dropping resistor 308 and the working gap form a very similar direct connected loop across D.C. power supply 304. The pulser amplifier for output transistor bank 306 is similar at least in principle to the circuitry of FIGURE 8. Transistor 306 is generally many transistors, perhaps hundreds of transistors capable of generating the very high output machining currents required in EDM. PNP transistor 314 may represent a bank of transistors for the pre-amplifier in a manner analogous to that of the tube bank 254 in the circuitry of FIGURE 8. In this circuitry, transistor driver bank 314 is non-conductive during conduction of transistor 306. PNP type transistor 306 is rendered conductive by D.C. power supply 312 through resistor 326 and choke 324. Conduction of transistor driver bank 314 connects the base of power bank 306 to positive D.C. bias 310 and thus cuts-off power bank 306 and shunts the current flow from resistor 326 and choke 324, such that the direction of electron flow in this instance is from drive voltage 312 through resistor 326, choke 324, collector-emitter of transistor 314 and back to the positive terminal of voltage 310.

Drive current during On time of transistor 306 is furnished from battery 312 through resistor 326, choke 324 and the base emitter circuit of transistor 306 back to the positive terminal of voltage 312. Choke 324 as well as choke 318 and 330 are included to provide sharp leading edge drive of the appropriate transistor network. During a period of conduction of transistor 314, increased electron flow is drawn through resistor 326 and choke 324 in accordance with the higher total voltage of bias 310 and drive voltage 312. As transistor 314 shuts off instantaneously, this increased electron flow is forced or accelerated through the base emitter circuit of arc power transistor 306, thus providing sharp leading edge drive in an accelerated manner for the duration of the inductive effect of choke 324. In a similar manner, as transistor 314 becomes instantaneously conductive, the increase in electron flow through choke 324 is momentarily retarded and provides for a sharp cut-off pulse to transistor 306, thus assuring vertical rise and fall and sharp switching action of each particular transistor stage. Similarly, NPN transistor 320 drives transistor 314 drawing electron flow from drive supply 312 through bias resistor 322, emitter collector of transistor 320 and base emitter circuit of transistor 314. Electron flow is momentarily retarded through choke 318 thus providing a sharp surge to transistor 314 for turn On through base emitter circuit of transistor 314 and bias resistor 350. During conduction a shunt electron flow also occurs through choke 318 and resistor 316. As transistor 320 is switched Off sharply, choke 318 sustains electron flow in the same direction and sharply cuts-off transistor 314 causing cut-off electron flow through resistor 316, resistor 350 and clearing the emitter base circuit of transistor 314.

NPN transistor 320 is likewise rendered conductive by the first drive transistor shown in this amplifier as transistor 334. Thus electron flow for drive of transistor 320 occurs from the negative terminal of supply 312 through limiting resistor 322, emitter base circuit of transistor 320, collector-emitter of transistor 334, resistor 332, bias supply 310, to the positive terminal of drive voltage 312. After a short delay determined by inductance 330, a shunt electron flow is also drawn through resistor 328 and inductance 330 in parallel with network 322, 320. As transistor 334 shuts off sharply, choke 330 sustains a cut-off electron flow through base-emitter of transistor 320, resistor 322, resistor 328, thereby clearing and sharply cutting off transistor 320.

The pulser drive shown in this instance as pulser 336 may be a tube type of pulser or multivibrator as shown in FIGURE 8, or it may be a commercially available pulser of suitable characteristics, or it may be a transistor multivibrator designed for particular control of the circuitry. It is not necessary to describe pulser 336 in detail since it has been covered in each of these other circuits. The important circuitry in FIGURE 9 is cut-off transistor 338 and its associated circuitry.

In a manner very similar to that of FIGURE 1 or FIGURE 8, transistor 338 operates as a per-pulse cut-off device in the circutry of FIGURE 9. It must be noted in this instance, that when transistor 334 is rendered conductive, output transistor bank 306 is rendered non-conductive. The arc machining pulse in FIGURE 9 occurs when transistor 306 is conductive and is interrupted during normal operation by the conduction of pulser 336 at selected time intervals through the base-emitter circuit of transistor 334.

Prior to the start of a machining pulse, pulser 336, transistor 334, transistor 314, are all conductive biasing power transistor bank 306 Off. In this condition, transistor 338 is also biased Off by the absence of any drive signal in its base circuit and by virtue of the direct resistance connection from the base of transistor 338 through potentiometer arm 340 and the lower leg of potentiometer 344 through the lower portion of potentiometer 346 to the emitter of transistor 338. Since no voltage exists in this loop, cut-off transistor 338 is non-conductive. At the initiation of an arc machining power pulse, pulser 336 becomes sharply non-conductive, rendering transistor 334 and transistor 314 non-conductive, thus permitting conduction of power transistor 306. If the space between electrode 300 and workpiece 302 is sufficient to permit voltage across the working gap, this voltage is also presented across potentiometer 346 and a portion of this voltage is presented at tap 348. After a momentary delay interval determined by the relative magnitude of condenser 342, the upper portion of potentiometer 344 and resistor 352, a keying signal occurs at potentiometer arm 340. The per-pulse cut-off operation in this instance compares the relative magnitude between the portion of the arc voltage at 348 and the keying signal at 340. If the arc voltage is of a sufficient magnitude to overcome the voltage at tap 340, transistor 338 is maintained in a non-conducting condition and thus does not affect the operation of the power circuitry. If the voltage at tap 348 is less than that of keying reference 340, transistor 338 becomes instantaneously conductive with drive electron flow in this instance occurring from the negative terminal of power voltage 304 through the lower portion of potentiometer 346, potentiometer arm 348, emitter-base of transistor 338, the upper portion of potentiometer 344 and resistor 352, collector-emitter of transistor 306, balancing resistor 354 to the positive terminal of power voltage 304, thus rendering transistor 338 conductive. This condition of conduction corresponds exactly to the performance of the other circuits in which a voltage lower than the pre-set magnitude occurring across the arc will instantaneously render the cut-off device active. In this instance, conduction of transistor 338 drives transistor 334 in such a manner as to interrupt conduction of transistor 306, thus instantaneously squelching the faulty pulse in the output.

In a manner similar to that of the previous circuits, transistor 338 may be so connected to directly affect the operation of the pulser by triggering the multivibrator portion of that pulser. In the circuitry shown in FIGURE 9, however, cut-off transistor 338 overcomes the action of pulser 336 and operates independently of the pulser to shut off the faulty cutting power. Performance of the circuitry in this manner has the one advantage that after the very short delay time encountered in the transistor components and the various stages of the amplifier, it is possible to re-ignite the arc immediately without waiting for the normal interval between pulses caused by pulser 336. Of course, no pulse of duration longer than that determined by pulser 336 is permitted and the action of the cut-off transistor 338 in this instance is only to cut-off the faulty portion of any particular pulse. By proper connection of components, this same effect, if desired, could be achieved in either of the other circuits. It is only important in this instance to realize that all of the circuits perform instantaneously to interrupt a faulty condition of machining and do not rely on a delay of many pulses to turn either On or Off positively. This method of operation represents a substantial step forward in the art of EDM since now each individual arc pulse is electronically inspected and interrupted or shut off instantaneously if a flaw or undesirable condition of machining occurs even during an individual pulse. Furthermore, increased efficiency results since only faulty pulses or faulty portions of an individual pulse are cut off and succeeding pulses which in many instances are entirely satisfactory are permitted the opportunity of machining.

Each of the previous circuits has included circuitry sensitive to gap voltage only and actuated during a decrease in gap voltage below a predetermined level. It is equally practical to control a per-pulse cut-off circuit in response to machining current rather than gap voltage. Such a circuit would respond instantaneously to an increase in machining current above a predetermined level and instantaneously interrupt the machining current. One example of such a circuit is shown in FIGURE 10. The cut-off circuitry of FIGURE 10 is intended to operate with the power circuitry of FIGURE 9, and per-pulse cut-off transistor 400 is intended to replace transistor 338 in FIGURE 9.

In the circuitry of FIGURE 10, the keying pulse in this instance tends to render transistor 400 non-conductive and the magnitude of keying voltage is selected by the position of potentiometer arm 406 and the relative ohmic values of potentiometer 404 and resistor 408. During an individual pulse or discharge between electrode 300 and workpiece 302 electron flow through sensing resistor 402 develops a positive voltage between terminals 410 and 412. If current flow is in excess of the desired amount, the voltage at 412 will be in excess of the voltage at reference arm 406 and electron flow will occur from point 410 through the lower portion of potentiometer 404, potentiometer arm 406, emitter-base of transistor 400 and point 412, thus rendering transistor 400 conductive. In a manner identical to that of the circuitry of FIGURE 9, conduction of transistor 400 instantaneously interrupts the machining power.

A similar circuit could be so arranged and selected to make an instantaneous comparison between the relative magnitude of current and voltage and thus actuate the per-pulse cut-off device if an undesirable balance occurred. It is intended by the disclosure of these circuits not to limit the application of this principle of per-pulse cut-off to the circuits shown herein, and these circuits shown are not intended to restrict the scope of the invention.

It must be understood that as used in this specification, the term "instantaneously" as it refers to interruption of an individual discharge, means rapidly and in a relatively small time compared to the total time of duration of an individual discharge. For a discharge having a total time duration of 100 microseconds, this time is typically 1 to 10 microseconds and could be adjusted appropriately for individual discharges of longer or shorter duration.

For these examples, I have shown a negative electrode and a positive workpiece. Advance in the art suggests that on selected occasions the opposite polarity may be used to better advantage. This is obtained by a simple reversal of the output of the EDM power supply, it being essential in each particular instance to provide timed space unidirectional pulses of the correct polarity. In each instance, reverse current in a direction opposite to that intended is extremely undesirable and frequently leads to severe damage of either the electrode or workpiece and each of these circuits provides for the correct conditions of operation in either polarity.

The inventive concept represented by each of these three figures is, of course, the per-pulse cut-off circuit in which each individual machining pulse is electronically inspected and either permitted to pass or interrupted instantaneously. Each new pulse is unencumbered by the history of the previous pulse; thus only faulty portions of the same pulse or faulty pulses or faulty operation of the equipment is interrupted. Other types of EDM circuitry have the severe limitation that many pulses are interrupted during any particular interval, and in many instances, a delay of many pulses occurs before interruption of a faulty condition of machining. This results in a condition known in the art as DC burning, in which successive pulses or continuous current flow occurs at one minute spot or point of contact between the electrode and work, thus severely damaging the electrode and work. It is possible in some instances that the EDM power supply and the electrode workpiece combination are completely ruined even though the normal short circuit or cut-off protection operates entirely in accordance with its design parameter.

The basic principles set forth above may be applied to any type of electronic switch circuit for use in EDM whether gas tube, vacuum tube, transistor or any of the newer devices having at least one control electrode for modulating the output power circuit in accordance with pulsing of said electrode. It is intended therefore that the basic principles set forth not be confined to the circuits disclosed or the type of electronic switches used therein.

It will thus be seen that I have shown and described three examples of a novel per-pulse cut-off EDM circuit which permits greater precision in electrical machining with the use of high power in the gap. These have been shown for illustrative purposes only and are not intended to restrict the scope of my invention which is capable of various embodiments in accordance with the principles herein set forth.

I claim:

1. In an apparatus for machining a conductive workpiece by intermittent electrical discharge across a gap between an electrode and said workpiece, a power source, an electronic switch connected to said power source operable to deliver power pulses of preselected normal voltage characteristic to said gap, a pulser operatively associated with said switch for pulsing said switch, and a cut-off device operatively associated with said pulser operable in response to predetermined deviation of gap voltage to interrupt an abnormal pulse within ten percent of the period of pulse duration.

2. In an apparatus for machining a conductive workpiece by intermittent electrical discharge across a gap between an electrode and said workpiece, a power source, an electronic switch connected to said power source operable to deliver power pulses of preselected normal voltage characteristic to said gap, a pulser operatively associated with said switch for pulsing said switch, and a cut-off device operatively associated with said pulser operable in response to predetermined deviation of gap voltage to interrupt operation of said pulser thereby to cut off an abnormal pulse within ten percent of the period of pulse duration.

3. In an apparatus for machining a conductive workpiece by intermittent electrical discharge across a gap between an electrode and said workpiece, an electron tube bank operable to deliver power pulses to said gap, a pulser operatively associated with said tube bank for pulsing the bank, and a cut-off device operatively associated with said pulser operable in response to predetermined deviation of gap voltage to instantaneously interrupt pulsing of said bank comprising a cut-off tube, means biasing said cut-off tube toward conductive condition in response to a power pulse signal from said pulser, and means responsive to maintenance of voltage across said gap above a predetermined minimum value for biasing said cut-off tube to non-conducting condition.

4. In an apparatus for machining a conductive workpiece by intermittent electrical discharge across a gap between an electrode and said workpiece, an electron tube bank operable to deliver power pulses to said gap, a pulser operatively associated with said tube bank for pulsing the bank, and a cut-off device operatively associated with said pulser operable in response to predetermined deviation of gap voltage to instantaneously interrupt pulsing of said bank comprising a cut-off tube and a transformer having its primary winding connected across said gap and its secondary winding connected to the control grid of said cut-off tube, whereby abnormal voltage across said gap will cause said cut-off tube to interrupt operation of said pulser.

5. Apparatus for machining a conductive workpiece by intermittent-electrical-discharge across a gap between an electrode and the workpiece which comprises, an electron tube bank, a pulser connected in the grid circuit of said bank for rendering said bank alternately conductive and non-conductive, a transformer having its primary winding connected to the output of said tube bank and its secondary winding connected across said gap, a safety cut-off device for preventing damage to the workpiece or to the tube bank from abnormal voltage or current conditions caused by short circuits across the gap or by malfunction of the apparatus comprising a network operable in response to abnormal voltage across the gap to instantaneously cut off said pulser.

6. In an apparatus for machining a conductive workpiece by intermittent electrical discharge across a gap between an electrode and said workpiece, a power source, an electronic switch connected to said power source operable to deliver power pulses of predetermined voltage characteristic to said gap, a pulser operatively associated with said switch for pulsing said switch, and a cut-off device operatively connected with said pulser and said gap operable in response to predetermined deviation of gap voltage to interrupt pulsing of said switch after initiation of but prior to completion of any pulse of abnormal voltage characteristic.

7. In an apparatus for machining a conductive workpiece by intermittent electrical discharge across a gap between an electrode and said workpiece, a power source, an electronic switch connected to said power source operable to deliver power pulses of predetermined voltage characteristic to said gap, a pulser operatively associated with said switch for pulsing said switch, and a cut-off device operatively connected with said pulser and said gap operable in response to predetermined deviation of gap voltage to interrupt operation of said pulser after initiation of but prior to completion of any pulse of abnormal voltage characteristic.

8. Apparatus for machining a conductive workpiece by intermittent electrical discharge across a gap between an electrode and the workpiece which comprises, a power source, a transistor bank connected in common emitter relationship between said power source and said gap, a pulser connected in the base circuit of said bank for rendering said bank alternately conductive and non-conductive, a safety shut-off device operatively associated with said pulser operable in response to predetermined deviation of gap voltage to instantaneously interrupt pulsing of said bank comprising a cut-off transistor, keying means tending to render said transistor conductive in phase with power pulses from said bank and means rendering said cut-off transistor non-conductive in response to maintenance of gap voltage within preselected range.

9. Apparatus for machining conductive workpieces by means of intermittent electrical discharge across a gap between an electrode and the workpiece comprising, a source of machining power, an electronic switch connected between said power source and said gap, a pulser operably associated with said switch for rendering said switch alternately conductive and non-conductive, a cut-off device operatively connected with said switch operable to render said switch instantly non-conductive, keying means operatively connected with said cut-off device tending to render said cut-off device operable in phase with said electronic switch, and means operable in response to gap discharge conditions inhibiting operation of said cut-off device during periods of gap operation of preselected characteristic.

10. The combination set forth in claim 9 wherein said inhibiting means is operable in response to maintenance of gap voltage above a predetermined minimum value.

11. Apparatus for machining a conductive workpiece by intermittent electrical discharge across a gap between an electrode and the workpiece which comprises, a power source, an electronic switching means connected between said power source and said gap, a pulser operatively connected to said switching means for rendering the same alternately conductive and non-conductive, a transformer having its primary connected to said switching means and its secondary connected across said gap, a safety cut-off device for preventing damage to said workpiece or to said switching means from abnormal voltage or current conditions caused by short circuits across the gap or by malfunction of the apparatus comprising, a network operable in response to abnormal voltage across the gap to instantaneously cut off said pulser.

12. Apparatus for machining conductive workpieces by means of intermittent electrical discharge across a gap between an electrode and the workpiece comprising, a source of machining power, an electronic switch connected between said power source and said gap, a pulser operatively associated with said switch for rendering said switch alternately conductive and non-conductive, a cut-off device operatively connected with said switch operable to render said switch instantly non-conductive, means operable in phase with said pulser for keying said cut-off device toward operative condition and means operable in phase with said pulser for preventing operation of said cut-off device when gap discharge characteristics are within preselected normal range.

13. Apparatus for machining a conductive workpiece by intermittent electrical discharge across a gap between an electrode and the workpiece which comprises, a power source, a transistor bank connected in common emitter relationship between said power source and said gap, a pulser connected in the base circuit of said bank for rendering said bank alternately conductive and non-conductive, a safety shut-off device operatively associated with said pulser operable in response to a gap voltage less than a predetermined minimum to instantaneously interrupt pulsing of said bank comprising, an NPN cut-off transistor, keying means tending to render said transistor conductive in phase with power pulses from said bank, and means rendering said transistor non-conductive in response to selected gap voltage.

14. The combination set forth in claim 13 wherein said keying means comprises a potentiometer having its end taps connected to the output of said bank and its adjustable tap adjusted to a selected value and connected in the base circuit of said cut-off transistor and in which the means rendering said transistor non-conductive comprises means connecting the emitter of said transistor to the gap for sensing gap voltage.

15. In an apparatus for machining a conductive workpiece by intermittent electrical discharge across a gap between an electrode and said workpiece, an electron tube bank operable to deliver power pulses to said gap, a pulser operatively associated with said tube bank for pulsing the bank, a cut-off device operatively associated with said tube bank operable in response to voltage across said gap reaching preselected magnitude to instantaneously interrupt pulsing of said bank comprising, a cut-off vacuum tube, means connecting the grid of said cut-off tube with the negative side of said gap including a resistor and a diode in series such that said cut-off tube is biased non-conductive during periods when the gap voltage is greater than said preselected magnitude, means including a keying resistor connecting the cathode of said cut-off tube to the positive side of said gap, means connecting said cathode with the anodes of said tube bank, the relative sizes of said resistors being such that a decrease in gap voltage to preselected magnitude will render said cut-off tube conductive and thus interrupt pulsing of said bank.

16. In an apparatus for machining a conductive workpiece by intermittent electrical discharge across a gap between an electrode and said workpiece, a power source, an electronic switch connected to said power source operable to deliver power pulses of preselected characteristic to said gap, a pulser operatively associated with said switch, and a cut-off device operatively connected with said pulser and said gap operable in response to predetermined deviation in the characteristic of each power pulse to interrupt pulsing of said switch after initiation of but prior to completion of any pulse of abnormal characteristic.

17. In an apparatus for machining a conductive workpiece by intermittent electrical discharge across a gap between an electrode and said workpiece, a power source, an electronic switch connected to said power source operable to deliver power pulses of preselected characteristic to said gap, a pulser operatively associated with said switch, and a cut-off device operatively connected with said switch and said gap operable in response to predetermined deviation in the characteristic of each power pulse to interrupt pulsing of said switch after initiation of but prior to completion of any pulse of abnormal characteristic.

18. In an apparatus for machining a conductive workpiece by intermittent electrical discharge across a gap between an electrode and said workpiece, a power source, an electronic switch connected to said power source operable to deliver power pulses of preselected characteristic to said gap, a pulser operatively associated with said switch, and a cut-off device operatively responsive to gap conditions operable in response to predetermined deviation in the characteristic of each power pulse to interrupt pulsing of the gap after initiation of but prior to completion of any pulse of abnormal characteristic.

References Cited in the file of this patent

UNITED STATES PATENTS

| | | |
|---|---|---|
| 2,707,250 | Hoover | Apr. 26, 1955 |
| 2,804,575 | Matulaitis | Aug. 27, 1957 |
| 2,815,445 | Young et al. | Dec. 3, 1957 |
| 2,866,921 | Matulaitis et al. | Dec. 30, 1958 |
| 2,903,555 | Porterfield | Sept. 8, 1959 |